United States Patent

Ross

[15] 3,646,478

[45] Feb. 29, 1972

[54] ENERGY COUPLER UTILIZING DIRECTIONAL COUPLERS AND DELAY LINES TO SIMULTANEOUSLY TRIGGER PLURAL CHARGING NETWORKS INTO TREE FOR SUMMING AT COMMON OUTPUT

[72] Inventor: Gerald F. Ross, Lexington, Mass.

[73] Assignee: Sperry Rand Corporation

[22] Filed: Mar. 27, 1970

[21] Appl. No.: 23,147

[52] U.S. Cl. ..................307/106, 328/56, 328/61, 333/9, 333/10, 333/31, 333/34, 333/84 M

[51] Int. Cl. ..................H01p 5/12, H01p 3/08, H03k 5/159

[58] Field of Search ..................333/9, 20, 34, 84, 84 M, 96, 333/97, 10, 70; 328/53, 55, 56, 65, 67, 104, 152, 154, 157, 34, 110; 307/106, 108, 109

[56] References Cited

UNITED STATES PATENTS

| | | | |
|---|---|---|---|
| 2,895,134 | 7/1959 | Sichak | 333/84 X |
| 2,877,427 | 3/1959 | Butler | 333/84 X |
| 3,105,197 | 9/1963 | Aiken | 328/154 |
| 2,836,798 | 5/1958 | Levine | 333/84 X |
| 2,837,638 | 6/1958 | Frink | 333/20 X |
| 3,171,040 | 2/1965 | Goebel | 328/55 X |
| 3,274,520 | 9/1966 | Eddy et al. | 333/26 X |
| 2,769,101 | 10/1956 | Drosd | 307/108 |
| 3,260,865 | 7/1966 | Jelinek-Fink et al. | 307/109 |

*Primary Examiner*—Herman Karl Saalbach
*Assistant Examiner*—Marvin Nussbaum
*Attorney*—S. C. Yeaton

[57] ABSTRACT

An electromagnetic energy coupling network for reciprocally processing energy flowing in pluralities of transmission lines is disclosed. The network may be employed individually or multiply as a coupling network element in complex coupling network matrices for the generation of subnanosecond signal impulses. The coupling element is a multiple port transmission line junction associated with tapered transmission lines and efficiently transferring energy inputs on such lines into a wave flowing only from a single output port.

6 Claims, 3 Drawing Figures

INVENTOR
GERALD F. ROSS
BY
HP Terry
ATTORNEY

INVENTOR
GERALD F. ROSS
BY
H P Terry
ATTORNEY

ENERGY COUPLER UTILIZING DIRECTIONAL COUPLERS AND DELAY LINES TO SIMULTANEOUSLY TRIGGER PLURAL CHARGING NETWORKS INTO TREE FOR SUMMING AT COMMON OUTPUT

BACKGROUND OF THE INVENTION

1. Field of the Invention

The invention pertains to combining networks or matrices for combining or reciprocally processing electromagnetic waves flowing in pluralities of transmission lines.

Combining or processing networks for efficiently combining coherent electromagnetic energy, especially such energy when of transient duration, are currently of increasing interest for reciprocally processing electromagnetic signals collected by multiple-collector array antennas. They have other equally significant areas of application, such as in signal generator systems wherein a plurality of coherently applied signals are processed by such combining networks to yield a maximum signal at a single output port. Generally, the novel combining network of the present invention has capabilities of efficient operation over a multiple-octave instantaneous frequency band when excited by input signal wave forms of subnanosecond duration.

2. Description of the Prior Art

The prior art has recognized that, in order to construct a coupling network or matrix for combining or reciprocally processing a plurality of coherent signals, a coupling element is required having special properties. The element may, for example, be a three-port junction and it must maximize the signal output at one of its ports; i.e., it must with maximum efficiency transfer any energy input at two of its ports to a third or output port and vice versa. Only this behavior results in a desired minimum over all network distortion or dispersion.

Known junctions have not filled the described need. For example, known types of high frequency or microwave directional couplers have been found to introduce time-domain distortion. To use such coupler devices, there must generally be tolerated a compromise trade off of efficiency against distortion. One type of directional coupling network minimizes distortion, but requires an impractical number of elements. Attempts to use other four-port biconjugate network elements in combining or signal processing networks or matrices have generally resulted in poor efficiency and severe dispersion.

SUMMARY OF THE INVENTION

The invention pertains to novel high frequency microwave transmission line coupling networks or matrices and applications thereof. The invention represents a novel bilateral elemental coupling device which may be used in multiple quantities in matrices for forming complex coupling system networks. The elemental coupling device is a three port transmission line junction employing specially tapered input and output transmission lines associated with a tee junction. Signal energy entering the two symmetric ports of the junction is transferred in total to a wave emanating from the third port, and vice versa.

The invention has use in coupling matrix or network systems for application in a novel high-voltage subnanosecond signal generator in which the contributions of a number of effectively discrete but coherent sources are summed by the coupling matrix according to a novel technique. An output pulse from a single port of the matrix or network represents a substantially perfect summation of the total energy of the plurality of effectively discrete sources.

While the invention is illustrated as being employed in a form of an integrated circuit known as planar microstrip transmission line, it is to be understood in the following discussion that other types of transmission lines, such as are commonly used with planar dielectric substrates, may also be used in demonstrating the invention. Thus, the invention may be employed with balanced strip, suspended substrate, slot line, H-guide, or the coplanar types of transmission lines. While the discussion which follows is in terms of use of the invention with microstrip or strip transmission lines, it may also readily be used with other types of transmission lines, including those mentioned above.

DESCRIPTION OF PREFERRED EMBODIMENT

Figure 1:
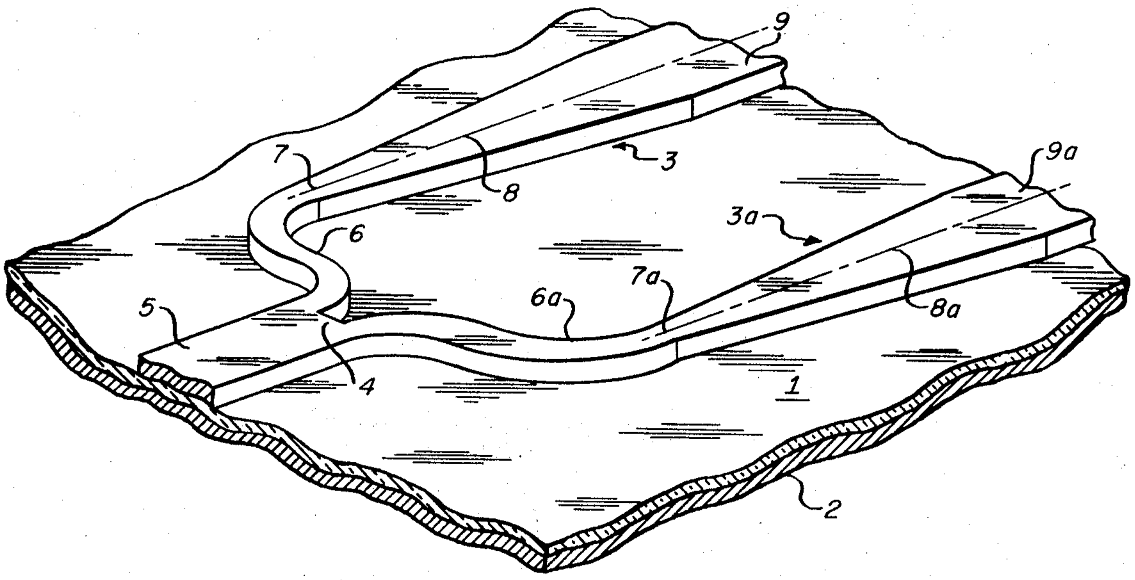
FIG. 1 is an isometric view, partly in section, of a preferred embodiment of the invention.

In FIG. 1, there is shown a planar microcircuit useful at microwave or very high frequencies as a bilateral electromagnetic wave transmission line energy coupler circuit. The circuit shown represents a fundamental coupling network concept according to the invention which may be used as a basic element in complex coupling networks or matrices and elsewhere.

The inventive transmission line device comprises at least a dielectric substrate 1 to one surface of which a relatively thin conductive ground sheet 2 may be bonded in any well-known manner. For example, the ground sheet 2 may be formed on one surface of the dielectric substrate 1 by evaporation of a suitable metal in a vacuum chamber from a heated source for distilling the desired conductive metal or by chemical electroplating or by other known metal plating methods.

The transmission line opposite ground plate 2 comprises, for example, planar or microstrip transmission line elements bonded to the second or upper surface of substrate 1. The transmission line system on the upper surface of substrate 1 may be bonded to substrate 1 by well-known methods, including methods of the type employed to generate and bond the ground sheet 2.

The planar microstrip circuit above referred to consists of a three-port transmission line junction having properties which will be further discussed in succeeding paragraphs. The three-port junction has symmetric arms 3 and **3*a*, both conductively joined via a coupling region 4 to a single planar transmission line 5. It is observed that branch lines 3 and 3*a* stem from the mutual coupling region 4, following oppositely directed doubly arcuate segments 6 and 6*a*. Segments 6 and 6*a* form smoothly curved transmission paths which ultimately become substantially parallel to the single transmission line 5, being conductively continued from the point where parallelism is reached at junctions 7 and 7*a* by tapered transmission line segments 8 and 8*a* to further parallel transmission lines sections 9 and 9*a*. It is to be understood that the parallel relation between line segments 5, 9, and 9*a*** is one of convenience for use in many applications, but that other angular relations between these line segments are more convenient in other applications and fall within the scope of the present invention.

Sections 9 and **9*a* have widths transverse to the directions of energy propagation substantially equal to the corresponding width of transmission line 5. The branch transmission line section including doubly arcuate sections 6 and 6*a* has, however, a lesser width than line segments 5, 9, and 9*a*. The tapered sections 8 and 8*a* have nonparallel sides adjusted so as smoothly and continuously to join section 6 to section 9 and section 6*a* to section 9*a***, respectively.

Referring to FIG. 1, it should be apparent that it is also within the scope of the invention to extend dielectric sheet 1 and ground plate 2 in the direction of transmission line 5 so as to accommodate an extension of the latter or to support additional active or passive high frequency or other circuits in any combination desired to interact with the inventive elements shown in FIG. 1. Likewise, substrate 1 and ground plate 2 may be extended in any desired direction to support additional active or passive circuit elements in any combination desired to interact with transmission lines 9 and **9*a***.

Figure 2:
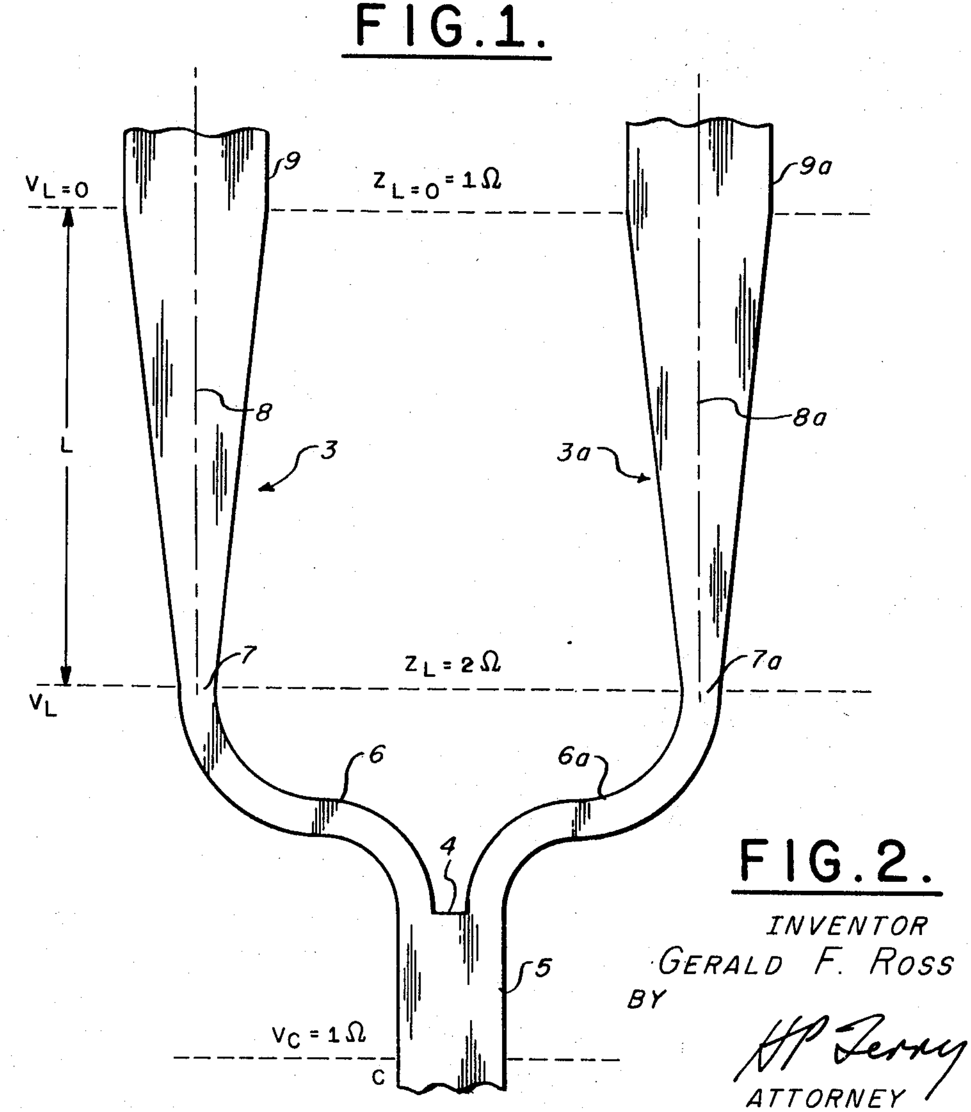
FIG. 2 is a plan view of the coupler circuit of FIG. 1 used in explaining the operation of the invention.

FIG. 2 is a simple outline only of the microcircuit bilateral coupler circuit shown in FIG. 1, as will readily be seen by comparison of the two figures. Corresponding parts have therefore been labeled with corresponding reference numerals. The purpose of FIG. 2 is to enable explanation of one theory of operation of the invention of FIG. 1.

Toward understanding the latter, it should be observed that the character of the tapered wave guide sections 8 and 8a is important to the success of the invention. For example, the transient behavior of such tapered transmission lines has been found to include a minimum of distortion, providing that the length L of each tapered section is great compared to the quantity $c\tau$, which quantity is the product of the input transient or impulse duration $\tau$ and the speed of light $c$, provided also that the change in impedance level from the high-impedance end of the tapered section to the other is less than three to one. The parameter $c\tau$ has been established in the field of microwave transient signal research as a useful parameter for identifying the behavior of transmission line elements exposed to short duration electromagnetic signals. For example, it has been reported in the literature as being of value in the qualitative evaluation of signal distortion in terms of the length of a tapered transmission line. For example, if $c\tau$ is very small compared to the length of a tapered line, only a negligible distortion will be suffered by signals traversing the tapered line.

The parameter $c\tau$ is also of interest in qualitatively defining the character of the junction region 4 where branch lines 6 and 6a join line 5. Here, for transmission of a relatively undistorted transient signal, the general area commonly regarded as the junction region needs to be great compared to $c\tau$. The region 4 then behaves like a simple resistive discontinuity to transients, rather than having distributed dispersive characteristics that cause signal distortion. With $c\tau$ very small by comparison, the dispersion or smearing of a very short pulse passing through region 4 is small compared to $\tau$. While the junction 4 itself is not readily defined in purely geometrical terms, it is readily defined in terms of the electromagnetic fields propagating across the junction. In essence, it has been described as involving an area centered on junction 4 where there are TEM and other propagation modes present. Departure a short distance from the actual junction region discovers the presence only of the TEM mode fields normally associated with propagation in planar microcircuit lines.

Assume, for instance, that a unit volt signal is incident at port A associated with branch 3 of the bilateral coupler of FIG. 2. Such a signal will propagate in planar strip line section 9 in substantially the TEM mode. When the unit signal begins to propagate in the tapered line section 8, its peak voltage value must increase in magnitude, as energy must be conserved. For example, it can readily be shown that the voltage amplitude at any distance L from the end 7 of tapered section 8 is:

$$V_L = V_{L=0}\sqrt{Z_L/Z_{L=0}} \quad (1)$$

For example, if:

$$Z_L = 2Z_{L=0}, \quad (2)$$

(e.g., $Z_{L=0}$=50 ohms, $Z_L$=100 ohms) then:

$$V_L = \sqrt{2}\,V_{L=0} \quad (3)$$

Thus, the impulse or transient signal approaching the tee junction 4 on the reversing arcuate path of transmission line 6 has increased in magnitude by the factor $\sqrt{2}$.

It can readily be shown that the reflection coefficient at junction 4 for a signal traveling in line 6 toward it is real and is given by:

$$\Gamma = \frac{Z - Z_0}{Z + Z_0} \quad (4)$$

For the indicated $Z_{L=0}$ and $Z_L$ values $\Gamma = -0.5$. It follows that the voltage $V_t$ transmitted from junction 4 toward the output port C and also toward port B associated with transmission line 3a is given by:

$$V_t = (1+\Gamma)V_L \quad (5)$$

or:

$$V_t = V_L/2 \quad (6)$$

In a similar manner, it will be seen that a unit voltage signal incident at port B associated with branch 3a of the bilateral coupler device produces a voltage $V_t$ transmitted from junction 4 toward the output port C and also toward port A associated with line 3, this voltage $V_t$ also being given by equation (6).

Accordingly, if operating generators of coherent signals are placed at ports A and B equidistant from transmission line junction 4, the total voltage $V_T$ contribution from both sources A and B at the output port C is predicted from equations (1) and (6) to be:

$$V_T = V_L = \sqrt{2}\,V_{L=0} \quad (7)$$

Thus, the net voltage at output port C has been increased by a factor of $\sqrt{2}$.

It also follows that under the circumstances cited above, all of the energy input at ports A and B is delivered to output port C; i.e., the coupler network is 100 percent efficient under such operation. In other terms, the transmitted voltage $V_t$ due to a generator at port A which appears from equation (6) to be transmitted toward port B is met at junction 4 by an identical but opposite reflected voltage due to the generator at port A. In other words, energy flow toward ports A and B cannot occur, these being forbidden paths when $Z_L = 2Z_{L=0}$. The network is 200 percent efficient, providing signals from ports A and B arrive at junction 4 simultaneously.

Figure 3:
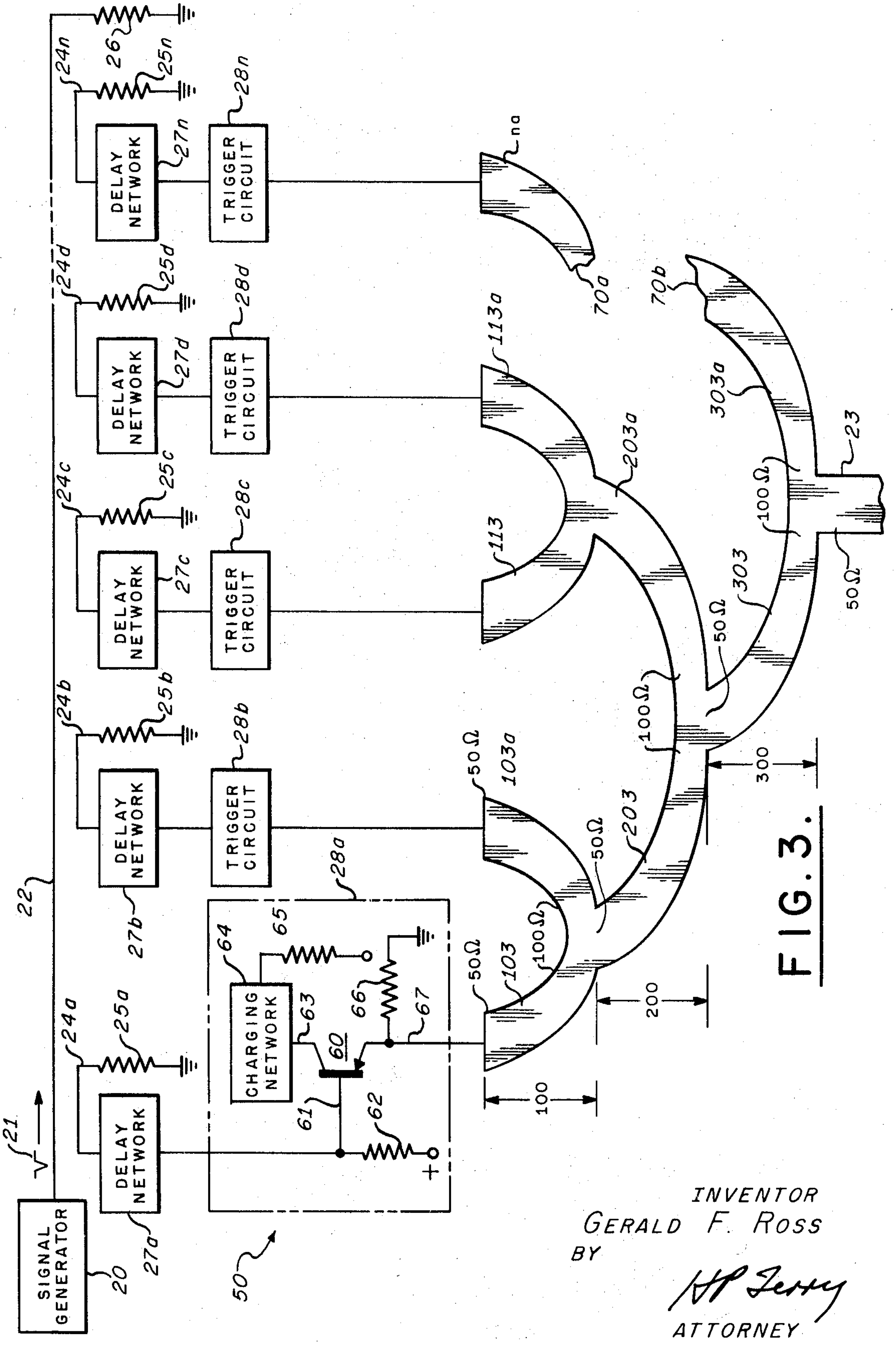
FIG. 3 is a circuit diagram illustrating a novel application of the invention as a signal generator.

FIG. 3 illustrates a novel application of the reciprocal energy combining network of FIGS. 1 and 2 in a system employing a bilateral tree matrix of such networks and utilizing semiconductor circuit techniques for obtaining subnanosecond impulses at significantly higher voltages than are customarily generated using semiconductor techniques. As is seen in FIG. 3, the impulse generator comprises a video signal generator 20 for supplying short video pulses of subnanosecond duration to a delay-trigger circuit array 50 comprising successive multiple parallel channel signal processing means, and a coupling matrix of novel three-port couplers in successive energy combining stages or tiers 100, 200, and 300. A final output is derived from stage 300 on transmission line 23. While no substrate and ground plane respectively corresponding to dielectric sheet 1 and ground plane 2 in FIG. 1 are illustrated in FIG. 3 merely as a matter of convenience, it is to be understood that stages 100, 200, and 300 of the coupling matrix may be bonded to such a substrate. Furthermore, additional circuits including delay-trigger circuit array 50 and video signal generator 20 may be additionally supported by well known techniques in common upon the same substrate.

Signal generator 20 comprises a known transient or short-duration pulse generator of the conventional type, for instance, using a single avalanche transistor in a circuit proven in the past to be capable of generating a pulse signal 21 of amplitude in the order of 20 volts and of 100 picoseconds length. Other circuits are also available for the purpose.

Signal generator 20 supplies video pulse 21 to a video transmission line 22 shown in the drawing for purposes of convenience as unshielded, though a shielded line may be alternatively used. Transmission line 22 is adapted to permit propagation of video pulse 21, substantially unattenuated, as a traveling wave from generator 20 to the opposite end of line 22. At the latter point, reflection of energy is prevented by the presence of grounded matched load resistor 26.

Terminated directional coupling devices 24a, 24b, 24c, 24d, . . . 24n of conventional type are inserted at equal intervals within video transmission line 22. The value $n$ is an even integer. Equal separation of the directional couplers is selected for convenience of design though, as will be seen, unequal separation may be chosen if properly adjusted delays are placed in portions of the delay-trigger circuits 50 yet to be described. One of the ends of the outputs of each of the directional couplers 24*a*, 24*b*, 24*c*, 24*d*, . . . 24*n* is respectively connected to matching terminal loads represented by resistors 25*a*, 25*b*, 25*c*, 25*d*, . . . 25*n*. The useful output junctions of directional couplers 24*a*, 24*b*, 24*c*, 24*d*, . . . 24*n* are connected to respective delay networks 27*a*, 27*b*, 27*c*, 27*d*, . . . 27*n*. The integral value $n$ is again even.

Delay networks 27*a*, 27*b*, 27*c*, 27*d*, . . . 27*n* may each comprise a coaxial line or cable having a known characteristic delay and a predetermined impedance characteristic. The delay of the successive networks diminishes by regular increments $\Delta$ where directional couplers 24*a*, 24*b*, 24*c*, 24*d*, . . . 24*n* are regularly spaced. For example, the delay of network 27*n* may be zero. The delay of network 27*d* is one increment $\Delta$ less than the delay of network 27*c*, the delay of network 27*c* is one increment $\Delta$ less than the delay of network 27*b*, and the delay of network 27*b* is one increment $\Delta$ less than the delay of network 27*a*. The delay increment $\Delta$ referred to is equal to the delay time $\Delta$ for the flow of energy along video transmission line 22 from directional coupler 24*a* to directional coupler 24*b*, from 24*b* to 24*c*, from 24*c* to 24*d*, and so forth. Whether $\Delta$ is an accurately fixed number or deviates from a fixed design value, compensation can readily be made by trimming networks 27*a*, 27*b*, 27*c*, 27*d*, . . . 27*n* according to established practice. In any event, the delay relations are readily adjusted so that video signals correspond to pulse 21 exit from all of the delay networks 27*a*, 27*b*, 27*c*, 27*d*, . . . 27*n* precisely simultaneously. These exiting signals flow to respective trigger circuits 28*a*, 28*b*, 28*c*, 28*d*, . . . 28*n*.

The structure of trigger circuit 28*a* will be discussed by way of example, since circuits 28*a*, 28*b*, 28*c*, 28*d*, . . . 28*n* are all similar. Trigger circuit 28*a* employs a transistor 60 as its active element. The base of transistor 60 is coupled via lead 61 both to the output of delay network 27*a* and through resistor 62 to a source of positive unidirectional voltage (not shown). The collector of transistor 60 is coupled via lead 63 to a charging network 64. The latter may be any suitable delay network, such as a coaxial transmission line whose center conductor may be periodically or otherwise charged through resistor 65 from a source of negative unidirectional voltage (not shown). Network 64 has a length whose value is determined in a manner yet to be discussed.

Transistor 60 is chosen from types of transistors designed for use normally as power switches and for other special properties. For example, the Motorola transistor sold as type 2N2481 in a TO–18 case, under the proper conditions, operates in the avalanche mode and is capable of triggering a considerable energy discharge. Other avalanche transistors may be substituted and, if they demonstrate unsatisfactorily slow rise times, avalanche diode circuits of known type may be used with them to sharpen the leading edges of their output pulses.

Trigger circuit 28*a*, while no output pulse is being caused to flow on output conductor 67, is in its charging mode; i.e., charging network 64 is progressively charged through resistor 65 from the negative voltage source. After it is charged, a negative potential is found at the collector lead 63 equal to the power supply voltage. No signal flows from the emitter lead 67 of transistor 60, however, until a video pulse exits from delay network 27*a*. With the video pulse amplitude properly related to the voltage level on base lead 61 due to the voltage source attached to resistor 62, instantaneous avalanche breakdown occurs across the emitter-collector circuit of transistor 60, and a greatly amplified impulse flows out of trigger circuit 28*a* on lead 67. By similar operation, such amplified pulses flow simultaneously from the output of trigger circuits 28*b*, 28*c*, 28*d*, . . . 28*n*, all of which circuits are similar to trigger circuit 28*a*. The number $n$ is again any even integer, as is indicated by the breaks 70, 70*a*, and 70*b* in the drawing. These breaks suggest that additional pairs of elements can be added to the delay-trigger circuit array 50 and that corresponding changes can be made in the yet-to-be-discussed energy combining stages 100, 200, and 300.

The energy combining bilateral network comprises a tree matrix with three successive tiers or stages 100, 200, and 300 which combines the transient or impulse signals exiting simultaneously from trigger circuits 28*a*, 28*b*, 28*c*, 28*d*, . . . 28*n* additively to produce a high-amplitude picosecond pulse on planar output transmission line 23. While each stage or tier of the combining network may comprise a row of dual branch coupling networks of the type discussed in connection with FIGS. 1 and 2, it is readily seen that other or simplified versions of that coupling network may also be employed.

Consider, for example, the alternative bilateral coupler network shown in FIG. 3 as comprising arms 103 and 103*a*. It is seen that each such arm is a smoothly tapered arm whose impedance varies from 50 ohms at its input to 100 ohms at its junction. For example, arms 103 and 103*a* smoothly taper in a distance L great compared to $c\tau$ from an impedance of 50 ohms to an impedance of 100 ohms. It should be noted that lead 67 may be simply a 50 ohm extension of arm 103. At the 100 ohm point, arms 103 and 103*a* symmetrically join the 50 ohm section of arm or exit port 203. It can readily be shown that the analysis used to explain the operation of the coupler of FIGS. 1 and 2 is applicable to the coupler of FIG. 3. The same result obtains: i.e., coherent signals simultaneously injected in arms 103, 103*a* at points equidistant from output line 203 combine so that the total voltage contribution $V_T$ from arms 103 and 103*a* goes into arm 203 and no signals are reflected from the junction into arms 103 or 103*a*. The elemental coupler network is again 100 percent efficient when signals from trigger circuits 28*a* and 28*b* flow simultaneously into the respective arms 103, 103*a*.

Stage 100 of the tree matrix comprises $n/2$ elemental couplers, each having two symmetric arms (as respective arms 103 and 103*a*, 113 and 113*a*, . . . $(n-1)a$ and $na$). The combined outputs of the $n/2$ elemental couplers of stage 100 respectively appears on $n/2$ output or third port 50 ohm arms, such as ports 203 and 203*a* of the first elemental coupler of stage 200.

Stage 200 consists of $n/4$ elemental couplers, represented in the drawing by the coupler above referred to as employing tapered symmetric arms 203 and 203*a*. These arms are seen to vary in impedance from 50 ohms at their input to 100 ohms at their junction with the 50 ohm input of arm 303.

The final stage 300 of the matrix tree consists of $n/8$ elemental couplers ($n/8 = 1$ for the case shown in FIG. 3), represented in the drawing by the elemental coupler employing tapered symmetric arms 303, 303*a*. These arms 303 and 303*a* are also seen to vary in impedance from 50 ohms at their junction with the 50 ohm input of the final output port 23. It is also seen that the symmetric arms of the successive stages of the matrix tree are of length always greater than $c\tau$. It will be understood that the effective junction regions respectively attached to the junctions coupling tiers 100, 200, and 300 are all large compared to $c\tau$. Any reflections due to unintentional mismatches in the coupler array may be absorbed harmlessly by a grounded 50 ohm resistor 66 placed in the emitter circuit of each transistor 60 of the trigger circuits 28*a*, 28*b*, 28*c*, 28*d*, . . . 28*n*.

In the typical combining matrix illustrated in FIG. 3, a triple tier matrix has been illustrated. It should be understood that other numbers of tiers, with consequent multiplication of the output signal on line 23 may readily be employed. The voltage amplification for increased numbers of tiers is readily calculated from equation (7). Thus, a unit voltage signal into two associated input ports produces $\sqrt{2}$ volts across a load at an output port. In a double tier system, a unit voltage input produces 2 volts at the output. The triple tier arrangement produces $2\sqrt{2}$ volts. A quadruple tier system would have 16 unit voltage generators at 16 inputs and would yield 4 volts on the single output line. Characteristic of each such network and independent of the number of tiers or stages in the network is the fact that the distances from each first stage input to the output at the last stage are always equal.

The novel reciprocal energy combining or coupling network is observed to have several identifying characteristics independent of the number of its tiers. For example, let $N_I$ be the total number of inputs to the network. $N_I$ is seen to be positive, nonzero, and to follow the progression 2, 4, 8, 16, 32 and so on. The number of coupling regions $N_{CR}$ follows the progression 1, 3, 7, 15, 31, and so on. The total number of branch arms $N_{BA}$ (including output arm 23) follows the progression 3, 7, 15, 31, 63, and so forth. Thus:

$$N_{CR}=N_I-1 \quad (8)$$

and:

$$N_{BA}=N_I+N_{CR} \quad (9)$$

or:

$$N_{BA}=2N_I-1$$

Thus, there are 2 $N_I$ branching arms which taper from an impedance level Z in a direction of energy propagation to an impedance level 2Z in a distance long compared to $c\tau$. Finally, the path from any one input terminal to the sole output terminal is the same length as any other such path. Reciprocal relations hold.

In operation of the signal generator of FIG. 3, it is seen that a given video pulse 21 from signal generator 20 arrives at successively later times along video transmission line 22 at the individual directional couplers **24*a*, 24*b*, 24*c*, 24*d*, . . ., 24*n* and therefore arrives at corresponding successive later times at the respective delay networks 27*a*, 27*b*, 27*c*, 27*d*, . . . 27*n*. Delay lines 27*a*, 27*b*, 27*c*, 27*d*, . . . 27*n* are, however, designed to compensate for the successive incremental delay changes so that the video pulses injected nonsimultaneously into delay lines 27*a*, 27*b*, 27*c*, 27*d*, . . . 27*n* all exit simultaneously from those lines. The respective signals are shaped, if desired, and greatly amplified by trigger circuits 28*a*, 28*b*, 28*c*, 28*d*, . . . 28*n*. The tree matrix comprising tiers or stages 100, 200, and 300** serves to combine additively and coherently the impulses appearing simultaneously upon its several inputs, providing a useful output signal of nanosecond length with a very sharp rise time and of a greatly increased amplitude. Signals of the order of 200 volts amplitude and 200 picosecond length are, for instance, readily attained. Such signals may be beneficially employed in many applications as, for example, in the generation of signals for employment in sophisticated communication systems and to enable the design and test of antennas and other microwave components for use in such systems.

While the invention has been described in its preferred embodiment, it is to be understood that the words that have been used are words of description rather than limitation and that changes within the purview of the appended claims may be made without departing from the true scope and spirit of the invention in its broader aspects.

I claim:

1. An impulse signal amplifier comprising:

source means for supplying an impulse signal, converter means responsive to said source means for converting said impulse signal into an impulse train of predetermined content, parallel circuit means responsive to said converter means for converting said impulses of said impulse train into simultaneously occurring impulses of substantially coherent identical time pattern, and transmission line matrix coupling means coupled to said parallel circuit means for providing an output by instantaneously combining said simultaneously occurring impulses into a single amplified impulse.

2. Apparatus as described in claim 1 wherein said converter means for converting said impulse signal into an impulse train comprises substantially nonreflecting traveling wave transmission line means having a plurality of pick off means spaced along said transmission line means.

3. Apparatus as described in claim 2 wherein said parallel circuit means for converting said impulse train comprises successive multiple parallel-channel signal-processing means, each said parallel channel means being coupled to a respective one of said pickoff means.

4. An impulse signal amplifier comprising:

source means for generating an impulse signal, converter means for converting said impulse signal into an impulse train of predetermined content, said converter means comprising traveling wave transmission line means having a plurality of pick off means spaced along said transmission line means, circuit means for converting said impulses of said impulse train into simultaneously occurring impulses of substantially coherent identical time pattern, said circuit means comprising successive multiple parallel channel signal-processing means, each said channel means being coupled to a respective one of said pickoff means, each said channel means comprising: delay circuit means, charging network means, trigger circuit means, and output circuit means, each said delay circuit means being adapted to provide an impulse of said impulse train to discharge said charging network means through said trigger circuit means into said output circuit means, and transmission line matrix coupling means for providing an output by combining said simultaneously occurring impulses at said output circuit means into a single amplified impulse.

5. Apparatus as described in claim 4 wherein the delay circuit means of said successive multiple parallel-channel signal processing means are so adjusted that said simultaneously occurring impulses of substantially coherent identical time pattern appear simultaneously on said output circuit means of said successive multiple parallel-signal processing means.

6. Apparatus as in claim 4 wherein said transmission line matrix coupling means and said successive output circuit means are so connected and arranged that the propagation times from all of said output circuit means through said transmission line matrix coupling means are equal.

* * * * *